United States Patent [19]
Peters

[11] Patent Number: 4,657,977
[45] Date of Patent: Apr. 14, 1987

[54] POLY(ETHERIMIDE-CARBONATE) BLOCK COPOLYMERS AND POLYMER BLENDS CONTAINING SAME

[75] Inventor: Edward N. Peters, Lenox, Mass.

[73] Assignee: General Electric Company, Pittsfield, Mass.

[21] Appl. No.: 784,511

[22] Filed: Oct. 4, 1985

[51] Int. Cl.$^4$ .............................................. C08L 53/00
[52] U.S. Cl. ........................................ 525/92; 525/67; 525/146; 525/148; 525/394; 525/420; 525/425; 525/430; 525/433
[58] Field of Search ................. 525/433, 146, 467, 66, 525/67, 92, 148, 394, 420, 425, 430

[56] References Cited

U.S. PATENT DOCUMENTS

| | | | |
|---|---|---|---|
| 3,030,335 | 8/1962 | Goldberg | 260/47 |
| 3,847,867 | 11/1974 | Heath et al. | 260/47 |
| 4,217,437 | 8/1980 | Schreckenberg et al. | 528/171 |
| 4,252,922 | 2/1981 | Adelmann et al. | 525/439 |
| 4,286,075 | 8/1981 | Robeson et al. | 525/68 |
| 4,436,839 | 3/1984 | Behnke et al. | 521/64 |

Primary Examiner—Theodore E. Pertilla
Attorney, Agent, or Firm—Hedman, Gibson, Costigan & Hoare

[57] ABSTRACT

Novel block copolymers containing polyetherimide and polycarbonate segments are prepared from hydroxy terminated polyetherimide oligomers, a dihydric phenol and phosgene or a phosgene precursor. The segmented block copolymers exhibit improved toughness and are useful as engineering thermoplastics, alone, or in combination with other resins.

16 Claims, No Drawings

POLY(ETHERIMIDE-CARBONATE) BLOCK COPOLYMERS AND POLYMER BLENDS CONTAINING SAME

CROSS REFERENCE TO RELATED APPLICATION

This application is related to concurrently filed U.S. patent application Ser. No. 784,362, now U.S. Pat. No. 4,611,048, by Edward Norman Peters entitled "Hydroxy Terminated Polyetherimide Oligomers".

The present invention relates to novel poly (etherimide-carbonate) block copolymers. More specifically, it relates to thermoplastic poly(etherimide carbonate) block copolymers and to resin blends comprising one or more thermoplastic polymers compatible therewith.

BACKGROUND OF THE INVENTION

Block copolymers of polycarbonates including segments of other polymers have been known, see for example, Goldberg, U.S. Pat. No. 3,030,335, Adelmann, et al., U.S. Pat. No. 4,252,922, and Behnke et al., U.S. Pat. No. 4,436,839 who disclose block copolymers of bisphenol-A carbonates including segments derived from polyalkylene glycols. In Schreckenberg et al., U.S. Pat. No. 4,217,437, the polyalkylene glycols are advantageously end-functionalized, e.g., with diphenol carbonates. Such block copolymers are useful per se as film formers and shaped articles because of toughness conferred on the polycarbonates by the segments of other polymers. The block copolymers can also be blended with polycarbonate resins, and a whole host of other thermoplastic addition and condensation polymers to provide thermoplastic addition and condensation polymers to provide thermoplastic molding compositions showing markedly improved resilience properties compared with the unblended resins.

It is also known that a highly useful family of heat resistant thermoplastic polymers is comprised of polyetherimide resins made by reacting a bis ether anhydride and an aromatic diamine. See, for example, Heath and Wirth, U.S. Pat. No. 3,847,867, who discloses the reaction product of 2,2-bis[4-2,3-dicarboxyphenoxy phenyl] propane dianhydride (BPA-DA) and metaphenylene diamine. The linear polymer is terminated with amino groups, and has a very high molecular weight and high melting point (Tg, typically=216° C.). Such a material cannot be readily blended with aromatic polycarbonate, because mixtures with two Tg's are obtained, one for the polyetherimide resin, and one for the polycarbonate. Furthermore, because of the amino terminal groups, polyetherimides cannot be successfully used as blocks in copolymers with aromatic polycarbonate segments, as is done with polyethers. Moreover, no method is known in the art to functionalize high molecular weight polyetherimide resins to accommodate their introduction as blocks into resin copolymers and, even if there were such methods, the length of the segments would probably be too high to provide a composition that would thermoform readily in conventional equipment.

It has now been found that an entirely new approach will solve the above-mentioned problems, and this is the subject matter of the present invention. The copending application of Edward Norman Peters, Ser. No. 784,362, discloses a method for preparing polyetherimides which are end functionalized with hydroxyl groups. When such polyetherimides are reacted with a polyhydric phenol and a carbonate precursor, there is surprisingly obtained a block copolymer which exhibits only one glass transition temperature Tg. Such copolymers also exhibit a high intrinsic viscosity, making them useful as engineering thermoplastics, and they are surprisingly compatible with other resins making available a number of new molding compositions.

SUMMARY OF THE INVENTION

According to the present invention there are provided poly(etherimide carbonate)s having a mean weight average molecular weight $M_w$ of between about 8,000 and 40,000 and being of the general formula (I) comprising:

(a) from about 5 to 80% by weight of polyetherimide segments (A) with mean number average molecular weight $M_n$ of between 1,000 and 6,000; and (b) polycarbonate segments (B):

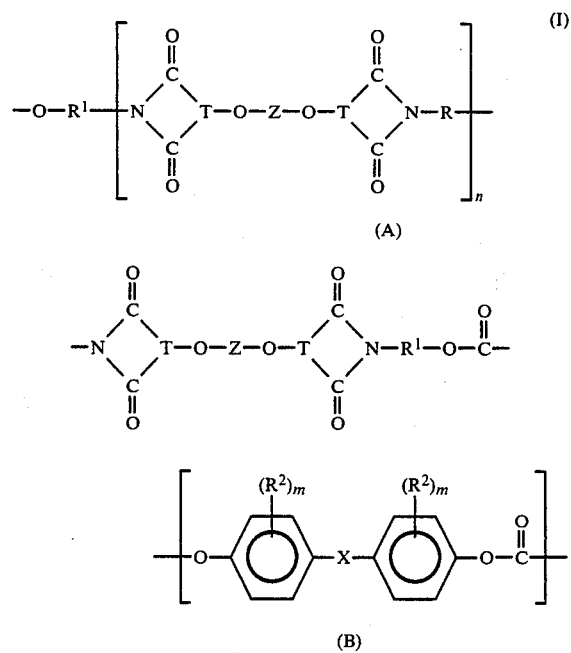

wherein the —O—T group is selected from:

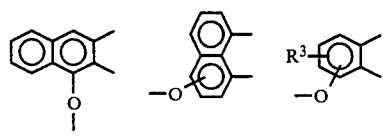

$R^3$ being hydrogen, lower alkyl or lower alkoxy; and Z is

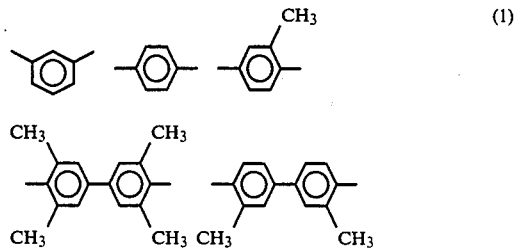

-continued

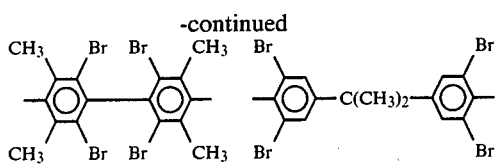

or a (2) divalent organic radical of the general formula:

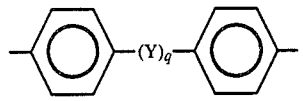

where Y is a divalent radical of the formulae:

$$-C_yH_{2y}-, \ -\overset{\overset{O}{\|}}{C}-, \ -\overset{\overset{O}{\|}}{\underset{\underset{O}{\|}}{S}}-, \ -O- \text{ and } -S-$$

where q is 0 or 1, y is a whole number from 1 to 5; and R is a divalent organic radical selected from (1) an aromatic hydrocarbon radical having from 6–20 carbon atoms and halogenated derivatives thereof, (2) an alkylene radical or a cycloalkylene radical having from 2–20 carbon atoms, a $C_{(2-8)}$ alkylene terminated polydiorgano-siloxane, and (3) a divalent radical of the formula:

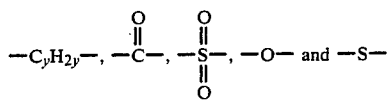

where Q is $$-O-, \ -\overset{\overset{O}{\|}}{C}-, \ -\overset{\overset{O}{\|}}{\underset{\underset{O}{\|}}{S}}- \text{ or } -C_xH_{2x}-$$

where x is a whole number from to 5 inclusive; and $R^1$ is as defined for R above; and X is a bond or $C_1$–$C_8$ alkylene, $C_2$–$C_8$ alkylidene, $C_5$–$C_{15}$ cylcloalkylene, $C_5$–$C_{15}$ cycloalklidene, $SO_2$, SO, O, CO or

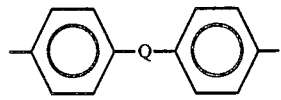

$R^2$ denotes hydrogen, chlorine, bromine or alkyl of 1 to 3 carbon atoms; and m is 1 or 2.

In preferred features, the poly (etherimide) blocks will be of the formula:

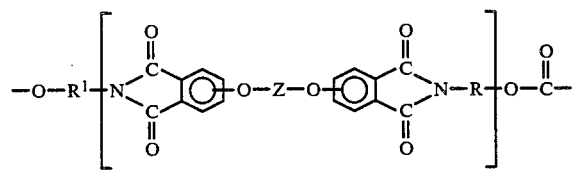

and especially those in which the divalent bonds of the —O—Z—O— radical are in the 3,3'; 3,4'; 4,3' or the 4,4' position. Also preferred are poly(etherimide carbonate)s as above defined wherein Z is

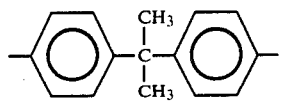

A preferred family of poly(etherimide carbonate)s will be as above defined in the first formula wherein R and $R^1$ are independently selected from

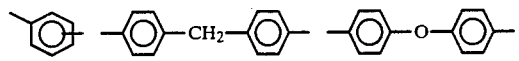

Special mention is made of poly(etherimide carbonate)s wherein R is

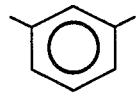

and $R^1$ is

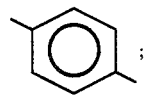

wherein X is 2,2 isopropylidene; wherein $R^2$ is either a hydrogen atom or methyl group in the 3' or 5' position; and wherein m is 2.

Especially preferred poly(etherimide carbonate) block copolymers will be as above defined wherein polyetherimide segment (A) comprises from about 80 to 20% by weight and polycarbonate segment (B) comprises from about 20 to 80% by weight; in which the polyetherimide segment (A) has a mean weight-average molecular weight $M_w$ between about 2,000 and 18,000 and the mean weight-average molecular weight $M_w$ of polycarbonate segment (B) is between about 2,000 and 18,000.

Also contemplated by the present invention are thermoplastic resin compositions comprising a blend of:

(a) from about 5 to 60% by weight of a poly(etherimide carbonate) block copolymer as defined above, and (b) at least one compatible thermoplastic polymer resin.

The thermoplastic blending polymer can vary widely, but preferably is selected from a polyester, an aromatic polycarbonate, a styrene polymer, an alkyl acrylate, a vinyl chloride polymer, a poly (arylether), a copolyetherester block copolymer, a polyhydroxyether, a polyimide, a polyphenylene ether, alone, or combined with a styrene resin, and compatible combinations of any of the foregoing.

DETAILED DESCRIPTION OF THE INVENTION

The hydroxy-terminated polyetherimide-oligomers used to prepare the poly(etherimide carbonate)s of this invention are of the formula:

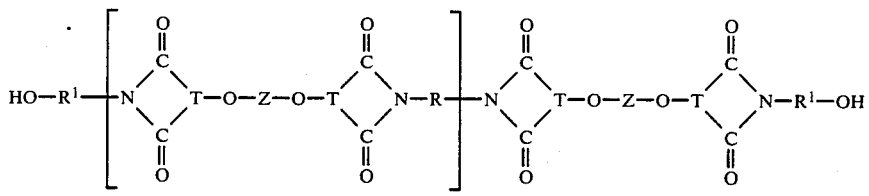

wherein n is an integer of from about 3 to about 12; and —O—T group is selected from the class consisting of:

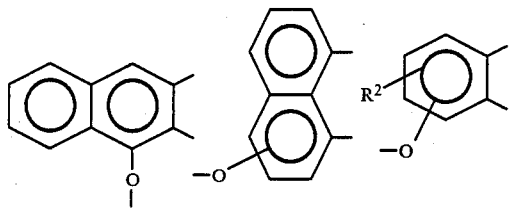

$R^2$ being hydrogen, lower alkyl or lower alkoxy; and Z is a member of the class consisting of:

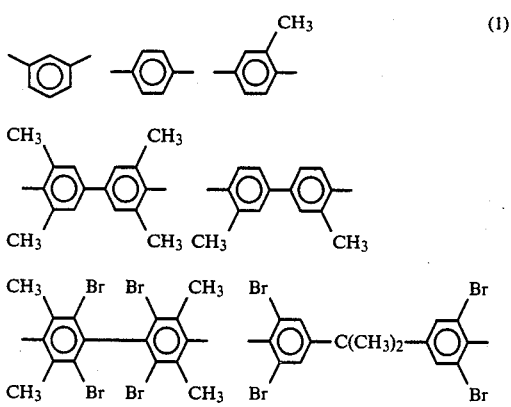

and (2) divalent organic radicals of the general formula:

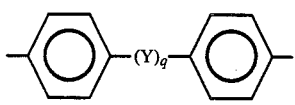

where Y is a member selected from the class consisting of divalent radicals of the formulae:

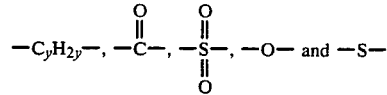

where q is 0 or 1, and y is a whole number from 1 to 5; and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula:

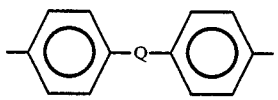

where Q is a member selected from the class consisting of:

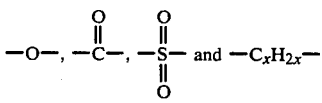

where x is a whole number from 1 to 5 inclusive; and $R^1$ is as defindd for R above.

In preferred features, the polyetherimide oligomer will be of the formula:

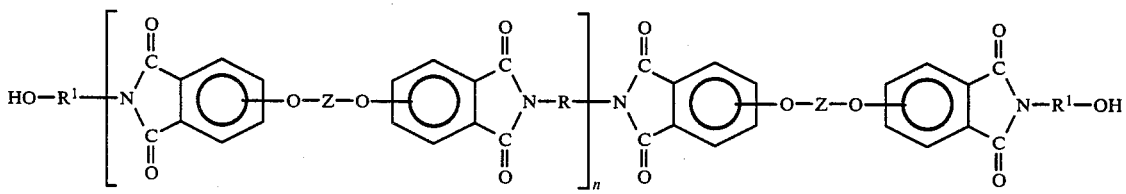

and especially those in which the divalent bonds of the —O—Z—O— radical are in the 3,3'; 3,4'; 4,3' or the 4,4' position. Also prepared are oligomers as above defined wherein Z is

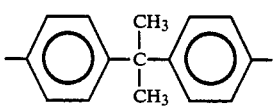

a preferred oligomer will be as above defined in the first formula wherein R and $R^1$ are independently selected from:

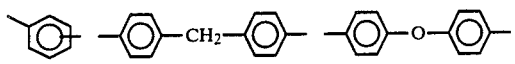

Special mention is made of oligomers wherein R is

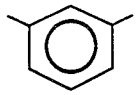

and R¹ is

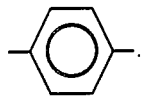

In most cases, n should be from about 3 to about 12, especially 6.5 to 7.5.

They can be prepared by a process comprising reacting a bis ether anhydride of the formula:

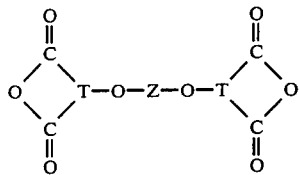

wherein T and Z are as defined above, with a diamine of the formula:

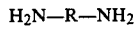

H₂N—R—NH₂ wherein R is as defined above, and an aminoalcohol of the formula:

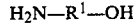

H₂N—R¹—OH wherein R¹ is as defined above; the mole ratio of said bis ether anhydride to said diamine to said aminoalcohol being in the range of from about 0.4–0.5:0.2–0.423:0-.4–0.077.

In preferred features of this aspect, the mole ratio of said bis ether anhydride to said diamine to said aminoalcohol is 1+b:b:2 where b is an integer of about 2 to about 12.

Suitable procedures will be given hereinafter. Reference is also made to the above-mentioned concurrently filed application Ser. No. 784,362.

The bis ether anhydrides used to prepare the polyetherimides are known or can be readily prepared by those skilled in this art. See, for example, Heath, et al., U.S. Pat. No. 3,847,867. In general, the disodium salt of a dihydric phenol is reacted with a nitroarylimide under condition wherein the C—O—C bonds are formed to give bisimides which are converted to bisanhydrides.

Aromatic bis(ether anhydride)s include, for example, 2,2-bis[4-(2,3-dicarboxyphenoxy)phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy) benzophenone dianhydride; 4,4'-bis(2,3-dicarboxyphenoxy)diphenyl sulfone dianhydride 2,2-bis[4-(3,4-dicarboxyphenoxy) phenyl]propane dianhydride; 4,4'-bis(3,4-dicarboxyphenoxy) diphenyl ether dianhydride; 4,4'-bis(3,4-dicarboxyphenoxy) diphenyl sulfide dianhydride; 1,3-bis(3,4-dicarboxyphenoxy) benzene dianhydride; 1,4-bis(3,4-dicarboxyphenoxy) benzene dianhydride; 4,4'-bis(3,4-dicarboxyphenoxy)benzophenone dianhydride; 4-(2,3-dicarboxyphenoxy)-4,(3,4-dicarboxyphenoxy)diphenyl-2,2-propane dianhydride; etc. and mixtures of such dianhydrides.

Suitable organic diamines include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminoaphthalene, 3,3'-dimethylbenzidine, 3,3'-dimethoxybenzidine, 2,4-bis(beta-amino-t-butyl)toluene, bis(p-beta-amino-t-butylphenyl)ether, bis(p-beta-methyl-o-aminopentyl) benzene, 1,3-diamino-4-isopropyl-benzene, 1,2-bis(3-aminopropoxy)ethane, m-xylylenediamine, p-xylyenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylopropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylendediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl) tetramethyldisiloxane, bis(4-aminobutyl) tetramethyldisiloxane, etc.

Suitable aromatic aminoalcohols can vary widely in type. In general, there can be used
p-aminophenol
m-aminophenol
4-hydroxy-4'-aminodiphenoylpropane
4-hydroxy-4'-aminodiphenyl methane
aminohydroxydiphenylsulfone,
4-hydroxy-4'-aminodiphenyl ether,
2-hydroxy-4-aminotoluene, and
illustratively any analogs of those given for the diamines above.

In general, the reactions can be advantageously carried out employing well-known solvents, e.g., o-dichlorobenzene, m-cresol/toluene, etc. in which to effect interaction between the dianhydrides and the diamines, at temperatures of from about 100° to about 250° C. Alternatively, the polyetherimides can be prepared by melt polymerization of any of the above dianhydrides with any of the above diamino compounds while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In preferred features of this aspect, the mole ratio of said bis ether anhydride to said diamine to said aminoalcohol is 1+b:b:2 where b is an integer of about 2 to about 12. The mole ratio of diamine to aminoalcohol can vary, but usually is in the range of 33–83 mole % of diamine to 67–17% aminoalcohol.

Preferred mole ratios are 0.4–0.5 bisether anhydride to 0.2–0.423 diamine to 0.4–0.077 aminoalcohol. Generally, useful hydroxyterminated polyetherimide oligomers have an intrinsic viscosity [ ]greater than 0.05 deciliters per gram, preferably 0.15 to 0.30, deciliters per gram when measured in chloroform at 25° C.

In one manner of providing the bisphenol A dianhydride, aromatic diamine and aromatic aminoalcohol are reacted in a solvent at 60° C. and then at 180° C. for 1 hour to 4 hours. Then the reaction mixture is cooled whereupon the product is isolated by adding to a nonsolvent such as methanol.

Generally speaking, the carbonate copolymers useful in connection with this invention are prepared by reacting a dihydric phenol compound, a carbonate precursor such as phosgene, a carbonate ester, etc. and the hydroxy terminated polyetherimide oligomer.

When a carbonate ester is used, the materials are reacted at temperatures of from about 150° C. to 300° C. or higher for times varying from 1 to 15 or more hours.

In one manner of proceeding the reaction is carried out using phosgene or phosgene-like dibasic acid halide in an organic basic material such as tertiary amine (e.g. pyridine, N,N-dimethylaniline, quinoline, etc.). The base can be used undiluted or diluted with inert solvents, for example hydrocarbons such as benzene, toluene, xylene, etc., and halocarbons such as chloroform, chlorobenzene, methylene chloride, etc. Tertiary amines are advantageous in that they serve to catalyze the reaction, are good solvents, and act as acceptors for halogen acid given off during the reaction. Although the phosgene reaction can be carried out over a wide range of temperatures, for example from below 0° C. to over 100° C., the reaction proceeds satisfactorily at 25° to 50° C. Since the reaction is exothermic, the rate of phosgene addition can be used to control the reaction temperature. Substantially equimolar amounts of phosgene can be used, although an excess of up to 1.5 moles or more may be employed. The concentration of the dihydroxy reactants in solvent can also be varied, although it is preferred for convenience to use a solution containing from about 1% to 25% by weight of dihydroxy compounds.

The reaction can be carried out by dissolving the dihydroxy reactants in the base, such as pyridine, and then bubbling phosgene into the stirred solution at the desired rate. The copolymer formed is separated and purified by any suitable means, as by pouring the reaction product into a stirred liquid capable of effecting precipitation, for example: hydrocarbons, alcohols, etc. The precipitation can also be carried out by the addition of a non-solvent to the copolymer solution. Anhydrous precipitants are preferred but water can also be used. After filtration, the precipitate is washed with a material capable of removing pyridine and pyridine hydrochloride to yield, upon drying, a finely divided product. Isopropanol is conveniently used both as a precipitating and washing agent.

Suitable phosgene-like dibasic acid halides, in addition to phosgene, include, for example, dibromo and diiodocarbonyls as well as the bishaloformates of dihydric phenols (e.g. bischloroformates of hydroquinone, Bisphenol-A, etc.) or glycols (e.g. bischloroformates of ethylene glycol, neopentyl glycol, polyethylene glycol, etc.). Other carbonate precursors will occur to those skilled in the art.

Copolymers can also be prepared by adding phosgene to an aqueous alkaline solution or suspension of the dihydroxy reactants. This is preferably done in the presence of inert solvents such as methylene chloride, benzene, toluene and the like. Quaternary ammonium compounds can be used to catalyze the reaction.

The block copolymers are preferably prepared in a heterogeneous phase system "the interfacial condensation" technique by reacting an aqueous sodium bisphenolate solution with phosgene and the hydroxy terminated polyetherimide oligomers in the presence of methylene chloride. This will be exemplified hereinafter.

The preparation in a heterogeneous phase system by the phase boundary process is described, for example, by S. H. Merrill, J. Polymer Sci., 55, 343 (1961), and the preparation in a homogeneous phase system by the pyridine process is described, for example, by K. P. Perry, W. J. Jackson, Jr. and J. R. Caldwell, Ind. Eng. Chem. Prod. Res. Develop., 2, 246 (1963).

Working up is carried out by methods known for polycarbonates, for example by evaporating off the solvent in devolatization extruders.

The molding compositions according to the invention, consisting of poly(etherimide carbonate) block copolymer resins and a second compatible resin are prepared in conventional mixing units, such as kneaders and screw extruders, or by mixing solutions of the two components and then isolating the molding composition via a devolatization extruder.

The mixtures can be employed as films and shaped articles in all cases where, on the one hand, high notched impact strengths at low temperatures, high toughness properties at relatively high wall thicknesses, and transparency are required.

When used herein and in the appended claims, "compatible" refers to blends or compositions of polymers in which the component polymers avoid stratification of the components during or after processing. Compatibility is of great significance for an admixture of different resins, because it ensures homogeneity, and a unity of properties, which greatly facilitates subsequent processing and use of the composition. Incompatible blends separate into phases containing predominantly their own separate components, and thus may be considered to be immiscible. This characteristic, combined with the often low physical attraction forces across the phase bounderies, usually causes immiscible/incompatible blend systems to have poor mechanical properties, thus preventing the preparation of useful polymer blends. When blends of two polymers exhibit a single glass transition temperature (Tg), it generally signifies the resin components are compatible. However, a single Tg is not a necessary condition for a compatible blend.

In accordance with the present invention there are provided thermoplastic compositions comprising a poly(etherimide carbonate) block copolymer resin and a thermoplastic addition or condensation polymer resin which have been melt admixed to provide a compatible composition.

The polymers which are mixed with the poly(etherimide carbonate) block copolymer to form the compatible composition are comprised of units derived from repeat groups including a heterogroup. Heterogroups are groups containing atoms besides carbon and hydrogen; such atoms are designated heteroatoms. The term hetero group also contemplates the heteroatoms themselves.

The polymers containing hetero groups can have the heterogroups (A) as pendant groups on the polymer chains or as linkages in the polymer chain:

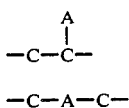

Typical examples of heteroatoms are oxygen, sulfur, nitrogen, halogen, etc. Examples of heterogroups are

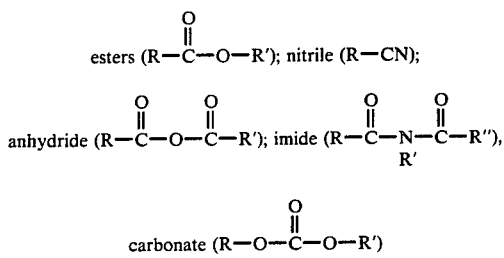

and the like. From the foregoing, it follows that blending polymers within the scope of this invention, without limitation, are illustrated by styrene resins, alkyl acrylate resins, vinyl halide polymers, polyesters, polycarbonates, polyimides, or combinations thereof, and the like.

Once formed, the product composition may be employed (or further processed) in conventional manner. Its applications include, for example, tough films useful in packaging. They may also be injection molded or extruded to produce a variety of useful thermoplastic articles.

In addition to at least two polymeric components, the present compositions may contain any of the conventional additives, for the purposes for which they are known. These additives include fire-retardants, impact modifiers, pigments, tints, reinforcing materials such as glass fiber, antioxidants and the like. They may be combined with the compositions either before or after melt mixing.

Addition polymers suitable for admixing with the polycarbonate are illustrated by the following:

(a) Styrene Resins

Styrene resins suitable for use herein are ABS type polymers, the molecules of which contain two or more polymeric parts of different compositions that are bonded chemically. The polymer is preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

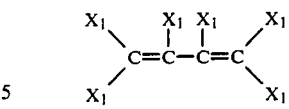

wherein $X_1$ is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are monovinylaromatic hydrocarbons. The monovinylaromatic monomers utilized are generically described by the following formula:

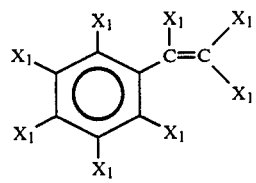

wherein $X_1$ is as previously defined. Examples of the monovinylaromatic compounds and alkyl-, cycloalkyl-, aryl-, alkaryl-, aralkyl-, alkoxy-, aryloxy-, and other substituted vinylaromatic compounds include styrene, 4-methylstyrene; 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, mixtures thereof, and the like. The preferred monovinylaromatic hydrocarbons used are styrene and/or alpha-methylstyrene.

A second group of monomers that may be polymerized in the presence of the prepolymerized backbone are acrylic monomers such as acrylonitrile, substituted acrylonitrile, and/or acrylic acid esters, exemplified by acrylonitrile, and alkyl acrylates such as methyl methacrylate.

The acrylonitrile, substituted acrylonitrile, or acrylic acid esters are described generically by the following formula:

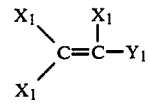

wherein $X_1$ is as previously defined and $Y_1$ is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, alpha-chloroacrylonitrile, alpha-chloroacrylonitrile, alpha-bromoacrylonitrile, and alpha-bromoacrylonitrile, methyl acrylate, methyl methacrylate, ethyl acrylate, butyl acrylate, propyl acrylate, isopropyl acrylate and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprises from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where alpha-methylstyrene (or other monomer) is substituted for the styrene in the composition used in preparing the graft polymer, a certain percentage of the composition may be an alpha-methyl-styrene-acrylonitrile copolymer. Also, there are occasions where a copolymer, such as alpha-methylstyreneacrylonitrile, is added to the graft polymer copolymer blend. When a graft is polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, 2-ethylhexylacrylate, and the like. Additionally, minor amounts of a diene may be copolymerized in the acrylate rubber backbone to yield improved grafting with the matrix polymer.

These resins are well known in the art and many are commercially available.

(b) Alkyl Acrylate Resin

The alkyl acrylate resin which may be used herein includes a homopolymer of methyl methacrylate (i.e., polymethyl methacrylate) or a copolymer of methyl methacrylate with a vinyl monomer (e.g., acrylonitrile, N-allylmaleimide, or N-vinyl maleimide), or an alkyl acrylate or methacrylate in which the alkyl group contains from 1 to 8 carbon atoms, such as methyl acrylate, ethyl acrylate, butyl acrylate, ethyl methacrylate and butyl methacrylate. The amount of methyl methacrylate is greater than about 70% by weight of this copolymer resin.

The alkyl acrylate resin may be grafted onto an unsaturated elastomeric backbone, such as polybutadiene, polyisoprene, and/or butadiene or isoprene copolymers. In the case of the graft copolymer, the alkyl acrylate resin comprises greater than about 50 weight percent of the graft copolymers.

These resins are well known in the art and are commercially available.

The methyl methacrylate resins have a reduced viscosity of from 0.1 to about 2.0 dl/g in a one percent chloroform solution at 25° C.

(c) Vinyl Chloride Polymers

The vinyl chloride polymers suitable for use herein are polyvinyl chloride and copolymers of vinyl chloride and copolymers of vinyl chloride with olefinically unsaturated polymerizable compounds which contain at least 80 percent by weight of vinyl chloride incorporated therein.

Olefinically unsaturated compounds which are suitable for copolymerization include vinylidene halides, such as vinylidene chloride and vinylidene fluoride, vinyl esters, such as vinyl acetate, vinyl propionate, vinyl butyrate, vinyl chloroacetate, vinyl benzoate, acrylate and alpha-alkyl-acrylate and their alkyl esters, amides and nitriles, methacrylic acid, maleic acid or anhydride, methyl methacrylate, ethyl acrylate, 2-ethyl hexylacrylate, butyl methacrylate, 2-hydroxypropyl acrylate, acrylamide. N-methyl acrylamide, acrylonitrile and methacrylonitrile, aromatic vinyl compounds, such as styrene and vinyl napthalene and olefinically unsaturated hydrocarbons such as ethylene-bicyclo[2,2,2]-hept-2-ene and bicyclo-[2,2,1]hepta-2,5-diene. Polymerized vinyl acetate may be hydrolyzed to provide vinyl alcohol moieties in the polymer.

These vinyl chloride polymers are well known in the art and can be prepared by the usual methods of solution, emulsion, suspension, bulk or mass polymerization.

Vinyl chloride polymers which have molecular weight of from about 40,000 to about 60,000 are preferred.

(d) Polyesters

Polyesters which are suitable for use herein are derived from an aliphatic or cycloaliphatic diol, or mixtures thereof, containing from 2 to about 10 carbon atoms and at least one aromatic dicarboxylic acid. The polyesters which are derived from an aliphatic diol and an aromatic dicarboxylic acid have repeated units of the following general formula:

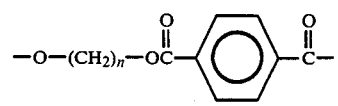

wherein n is an integer of from 2 to 14.

The preferred polyester is poly(ethylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). These can be made following the teachings of, for example, U.S. Pat. Nos. 2,465,319 and 3,047,539.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with an aromatic dicarboxylic acid so as to produce a polyester having recurring units of the following formula:

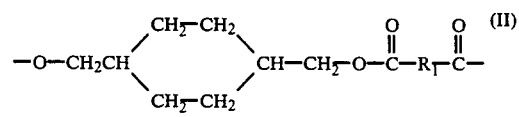

wherein the cyclohexane ring is selected from the cis- and trans-isomers thereof and $R_1$ represents an aryl radical containing 6 to 20 carbon atoms and which is the decarboxylated residue derived from an aromatic dicarboxylic acid.

Examples of aromatic dicarboxylic acids represented by the decarboxylated residue $R_1$ in formula II are isophthalic or terephthalic acid; 1,2-di(p-carboxyphenyl) ethane, 4,4'-dicarboxydiphenyl ether, etc., and mixtures of these. All of these acids contain at least one aromatic nucleus. Acids containing fused rings can also be present, such as in 1,4 or 1,5-naphthalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids.

Still another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl./g. as measured in a 60:40 phenol/tetrachloroethane mixture of similar solvent at 23°–30° C.

(e) Aromatic Polycarbonate

Thermoplastic aromatic polycarbonates that can be employed as the thermoplastic heterogroup containing polymer herein are homopolymers and copolymers and mixtures thereof, which have an intrinsic viscosity of from about 0.4 to about 1.0 dl/g. as measured in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)propane, 4,4-bis(4-hydroxyphenyl)heptane, 2-2(3,5,3',5'-tetrabromo-4,4'-dihydroxydiphenyl)propane, 3,3'-dichloro-4,4'-dihydroxy-diphenyl)methane, and the like. Other dihydric phenols of the bisphenol type are described above.

It is, of course, possible to employ two or more different dihydric phenols, or a copolymer of a dihydric phenol, with a glycol or with hydroxy or acid terminated polyesters, or with a dibasic acid, in the event a carbonate copolymer or inter-polymer rather than a homopolymer is desired for use in the preparation of the aromatic carbonate polymer containing hetero-group.

The aromatic polycarbonate polymers may be prepared by methods well known in the art, by using phosgene or haloformate and by employing a molecular weight regulator, an acid acceptor and a catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

The polycarbonates can be prepared in one-phase (homogeneous solution) or two-phase (interfacial) systems when phosgene or a haloformate are used. Bulk reactions are possible when the diarylcarbonate precursors are used.

(f) Poly(arylether)s

Poly(aryl ether) resin components suitable for use herein are linear, thermoplastic polyarylene polyether polysulfones, wherein the arylene units are interspersed with ether and sulfone linkages. These resins may be obtained by reaction of an alkali metal double salt of a dihydric phenol and a dihalobenzenoid compound, either or both of which contain a sulfone or ketone linkage, i.e., —SO$_2$ or —CO between arylene groupings, to provide sulfone or ketone units in the polymer chain in addition to arylene units and ether units. The polysulfone polymer has a basic structure comprising recurring units of the formula:

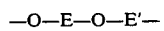

wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such polysulfones are included within the class of polyarylene polyether resins described in U.S Pat. Nos. 3,264,536 and 4,108,837, for example.

The residuum of a dihydric phenol, E, is derived from dinuclear phenols having the structure:

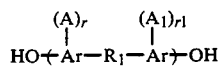

wherein Ar is an aromatic group and preferably is a phenylene group, A and $A_1$ may be the same or different inert substitutent groups, such as alkyl groups having from 1 to 4 carbon atoms, halogen atoms, i.e., fluorine, chlorine, bromine or iodine or alkoxy radicals having from 1 to 4 carbon atoms, r and $r_1$ are integers having a value of from 0 to 4, inclusive, and $R_1$ is representative of a bond between aromatic carbon atoms as in dihydroxydiphenyl, or is a divalent radical, including, for example, CO, O, S, S—S, SO$_2$, or a divalent organic hydrocarbon radical, such as alkylene, alkylidene, cycloalkylene, or the halogen, alkyl, aryl, alkaryl, or like substituted alkylene, alkylidene and cycloalkylene radicals as well as alkarylene and aromatic radicals and a ring fused to both Ar groups.

Typical preferred polymers have recurring units having the following structure:

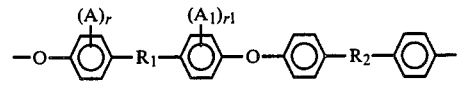

as described in U.S Pat. No. 4,108,837, supra.

The poly(aryl ether)s have a reduced viscosity of from about 0.4 to about 1.5 dl/g as measured in an appropriate solvent at an appropriate temperature depending on the particular polyether, such as in methylene chloride at 25° C.

(g) Copolyetherester Block Copolymer

Copolyetheresters suitable for use herein are well known in the art and are described in, for example, U.S. Pat. Nos. 3,784,520 and 3,766,146.

The polyester comprises a multiplicity of recurring intralinear a long chain and short chain ester units connected head-to-tail through ester linkages, said long chain ester units being represented by the following structure.

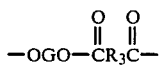 (a)

said short chain ester units being represented by the following structure:

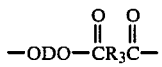 (b)

wherein G is a divalent radical remaining after removal of terminal hydroxy groups from a poly(alkylene oxide) glycol having a molecular weight of from about 400 to about 3500; D is a divalent radical remaining after removal of hydroxyl groups from a low molecular weight diol having a molecular weight of less than about 250; and $R_3$ is a divalent radical remaining after removal of carboxyl groups from a dicarboxylic acid having a molecular weight of less than about 300, with the proviso that the short chain ester units constitute from about 25 to about 65% by weight of the copolyester, a least about 70% of the $R_3$ groups are 1,4-phenylene radicals, at least about 70% of the D groups are 1,4-butylene radicals, and the sum of the percentages of the $R_3$ groups which are not 1,4-phenylene radicals and the D groups which are not 1,4-butylene radicals does not exceed about 30%.

The term "long chain ester units" as applied to units in a polymer chain refers to the reaction product of a long chain glycol with a dicarboxylic acid. Such "long chain ester units", which are repeating units in the copolyester herein, correspond to the structure (a) above. The long chain glycols may be poly(alkylene oxide) glycols having a molecular weight between about 400 and about 3500, preferably between about 600 and about 2000. Copolyesters prepared from poly(alkylene oxide)glycols having a molecular weight between about 600 to about 2000 are preferred.

The term "short chain ester units" as applied to units in a polymer chain refers to low molecular weight compounds or polymer chain units having molecular weight of less than about 550. They are made by reacting a low molecular weight diol, (below about 250), with a dicarboxylic acid, to form ester units represented by structure (b) above.

Included among the low molecular weight diols, (other than 1,4-butanediol), which react to form short chain ester units are acyclic, alicyclic and aromatic dihydroxy compounds. Preferred are diols with from 2 to 15 carbon atoms, such as ethylene, propylene, isobutylene, tetramethylene, pentamethylene, 2,2-dimethyltrimethylene, hexamethylene and decamethylene glycols, dihydroxy cyclohexane, cyclohexanedimethanol, resorcinol, hydroquinone, 1,5-dihydroxy naphthalene, etc. Especially preferred are aliphatic diols containing from 2 to 8 carbon atoms. Included among the bisphenols which can be used as bis(p-hydroxy)diphenyl, bis(p-hydroxyphenyl) methane, and bis(p-hydroxyphenyl)propane.

Dicarboxylic acids (other than terephthalic acid) which are reacted with the foregoing long chain glycols or low molecular weight diols to produce the copolyesters are aliphatic, cycloaliphatic or aromatic dicarboxylic acids.

Representative aliphatic and cycloaliphatic acids which may be used are sebacic acid, 1,3-cyclohexane dicarboxylic acid, 1,4-cyclohexane dicarboxylic acid, adipic acid, glutaric acid, succinic acid, carbonic acid, cyclopentanedicarboxylic acid, decahydro-1,5-naphthylene dicarboxylic acid and 4,4-bicyclohexyl dicarboxylic acid. Preferred aliphatic acids are cyclohexane-dicarboxylic acids.

Representative aromatic dicarboxylic acids which may be used include phthalic, terephthalic and isophthalic acids, substituted dicarboxy compounds with two benzene nuclei, such as bis(p-carboxyphenyl)methane and p-carboxyphenyl/oxybenzoic acid. Among the aromatic acids, those with from 8 to 16 carbon atoms are preferred, particularly the phenylene dicarboxylic acids, i.e., terephthalic and isophthalic acids.

Preferably, at least about 70 mole percent of the dicarboxylic acid incorporated into the polymer is terephthalic acid and at least about 70 mole percent of the low molecular weight diol incorporated into the polymer is 1,4-butanediol. Thus, at least 70% of the $R_3$ groups in structures (a) and (b) above are 1,4-phenylene radicals and at least about 70% of the D groups in formula b above are 1,4-butylene radicals.

The most preferred copolyesters are those prepared from dimethylterephthalate, 1,4-butanediol and poly(tetramethylene oxide) glycol having a molecular weight of from about 600 to about 1500.

The copolyetheresters described herein can be made conveniently by a conventional ester interchange reaction by methods well known in the art and as described in, for example, U.S. Pat. Nos. 3,784,520 and 3,766,146.

(h) Polyhydroxyether

The thermoplastic polyhydroxyethers which may be used herein have the following general formula:

where F is the radical residuum of a dihydric phenol, D" is a radical residuum of an epoxide selected from mono- and diepoxides and which contain from 1 to 2 hydroxyl groups, and n is an integer which represents the degree of polymerization and is at least about 30 and preferably is above about 80.

In general, thermoplastic polyhydroxyethers are prepared by contacting, under polymerization conditions, a dihydric phenol and an epoxide containing from 1 to 2 epoxide groups in substantially equimolar amounts by methods well known in the art.

These polyhydroxy ethers are prepared by methods well known in the art, such as those described in, for example, U.S. Pat. Nos. 3,238,087; 3,305,528; 3,294,747; and 3,277,051.

(i) Polyimides

Polyimides prepared from the reaction between substantially equal molar amounts of aromatic bis(ether anhydride)s of the formula,

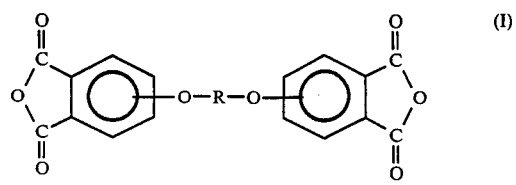 (I)

wherein R is an arylene radical of, for example 6 to 12 carbon atoms, and organic diamine of the formula, $$H_2NR^1NH_2$$

wherein $R^1$ is alkylene, arylene, and the like of 2 to 30 carbon atoms, in the presence of a phenolic solvent which produces a solution which remains homogeneous when the mixture is allowed to cool to room temperature. There is obtained a solution of polyimide in the phenolic solvent. The polyimide can be recovered by effecting its separation from the phenolic solvent mixture with a non-solvent for polyimide, such as methanol.

These polyimides are prepared by methods well known in the art such as those described in, for example, U.S. Pat. No. 3,917,643.

(j) Polyphenylene ethers

The polyphenylene ethers generally comprise structural units having the formula:

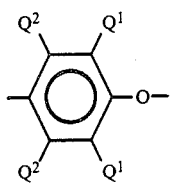

In each of said units independently, each $Q^1$ is independently hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymers and copolymers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are known in the art. Also contemplated are graft copolymers, including those prepared by grafting onto the polyphenylene ether chain such vinyl monomers as acrylonitrile and vinylaromatic compounds (e.g., styrene), and such polymers as polystyrenes and elastomers. Other suitable polyphenylene ethers are the coupled polyphenylene ethers in which the coupling agent is reacted with the hydroxy groups of two polyphenylene ether chains to increase the molecular weight of the polymer. Illustrative coupling agents are low molecular weight polycarbonates, quinones, heterocycles and formals.

The polyphenylene ether generally has a molecular weight (number average, as determined by gel permeation chromatography, whenever used herein) within the range of about 5,000–40,000; its intrinsic viscosity is most often in the range of about 0.45–0.5 dl./g., as measured in chloroform at 25° C.

The polyphenylene ethers may be prepared by known methods, typically by the oxidative coupling of at least one corresponding monohydroxyaromatic compound. A particularly useful and readily available monohydroxy-aromatic compound is 2,6-xylenol (wherein each $Q^1$ is methyl and each $Q^2$ is hydrogen), whereupon the polymer may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound such as a copper, manganese or cobalt compound, usually in combination with various other materials.

A first class of preferred catalyst systems consist of those containing copper. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Manganese-containing systems constitute a second preferred class of catalysts. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, alpha-hydroxyoximes (monomeric and polymeric), o-hydroxyaryl oximes and beta-diketones. Also useful are cobalt-containing catalyst systems.

The following Procedures illustrate the preparation of intermediates used in the present invention.

PROCEDURE A

In a five liter, 3-necked flask equipped with mechanical stirrer, thermometer, nitrogen inlet and Dean-Stark trap/condenser was charged with 2 liters of o-dichlorobenzene, 1145.03 grams (2.20 moles) bis(4-(3,4-dicarboxy-phenoxy) phenyl) propane dianhydride, and 0.2 grams sodium benzophosphonate. Under nitrogen the mixture was stirred and heated to 60° C. After 30 minutes 216.28 grams (2.00 moles) m-phenylene diamine was added. After stirring for 30 minutes 43.65 grams (0.40 moles) p-aminophenol was added and the temperature was slowly raised to 180° C. with azeotropic removal of water. After two hours at 180° C. the mixture was cooled. The oligomer was isolated by precipitation in methanol. The resultant powder was dried at 125° C. under vacuum. This material exhibited an intrinsic viscosity of 0.18 dl./g. as measured in chloroform and a number average molecular weight of 3660 by gel permeation chromotography, a compound of the formula:

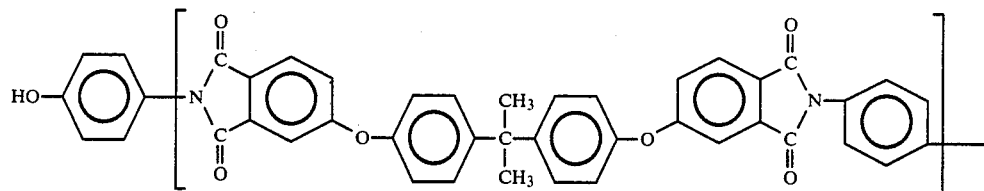

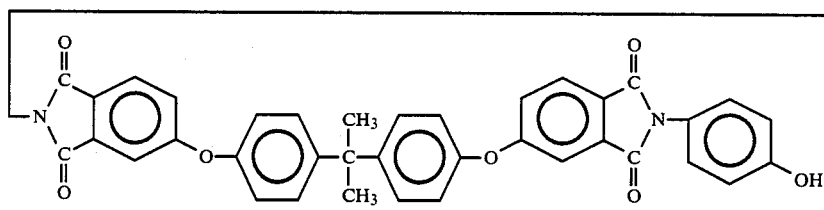

PROCEDURE B

If the procedure of Procedure A is repeated and if 4,4-diaminodiphenylmethane is substituted for the diamine, a polymer with an intrinsic viscosity of 0.16 dl./g. (in chloroform) is obtained.

PROCEDURE C

If the procedure of Procedure A is repeated and if 4-amino-4'-hydroxydiphenyl propane is substituted for the p-aminophenol, a polymer with an intrinsic viscosity of 0.19 dl./g. (chloroform) is obtained.

PROCEDURE D

If the procedure of Procedure A is repeated and if m-aminophenol is substituted for the p-aminophenol, a polymer with an intrinsic viscosity of 0.15 dl./g. (chloroform) is obtained.

PROCEDURE E

If the procedure of Procedure A is repeated and if the following bis ether anhydrides are substituted:
bis [3-(3,4-dicarboxyphenoxy) phenyl]propane dianhydride
3-(3,4-dicarboxyphenoxyphenyl)-4'-(3,4-dicarboxyphenoxyphenyl)-1,3-propane dianhydride;
and 4-(3,4-dicarboxyphenoxyphenyl)-3'-(3,4-dicarboxyphenoxyphenyl)1,3-propane carbonate, and if p-phenylenediamine, 4,4'-diaminodiphenylmethane, and 4,4'-diaminodiphenylether are substituted for m-phenylenediamine, and m-aminophenol, 4-amino-4'-hydroxydiphenylmethane and 4-amino-4'-hydroxydiphenyl ether are substituted for p-aminophenol, the corresponding hydroxy-terminated polyetherimide oligomers used in this invention will be obtained.

DESCRIPTION OF THE PREFERRED EMBODIMENTS

The following examples illustrate the present invention, but are not intended to limit it in any manner whatsoever.

EXAMPLE 1

In a 2-liter flask equipped for interfacial condensation was added the end-capped polyetherimide of Procedure A, 75 g. (0.0167 mole), 75 g. (0.329 mole) of bisphenol-A, 660 ml. of methylene chloride, 1 ml. of triethylamine, 1.59 (0.010 moles) p-tert-butylphenol and 450 ml. of water. The pH was raised to 10.5–11.5 and the mixture was phosgenated at 0.75 g./min. for 45 minutes. The layers were separated, washed with water, washed with hydrochloric acid, and washed with water to pH 7. The block co-polymer was precipitated in hot water (85°–90° C.). It had an intrinsic viscosity of 0.62 dl./g. (in chloroform). It had a single Tg of 170° C.

The product contained units of the formula

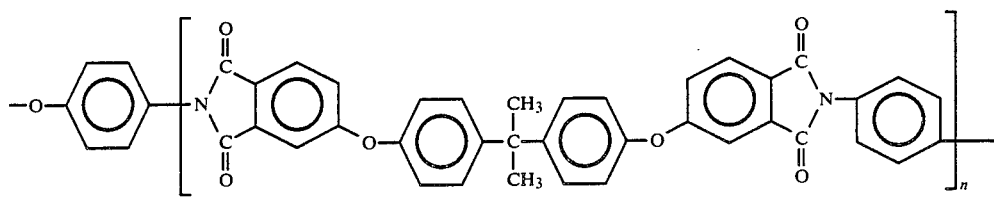

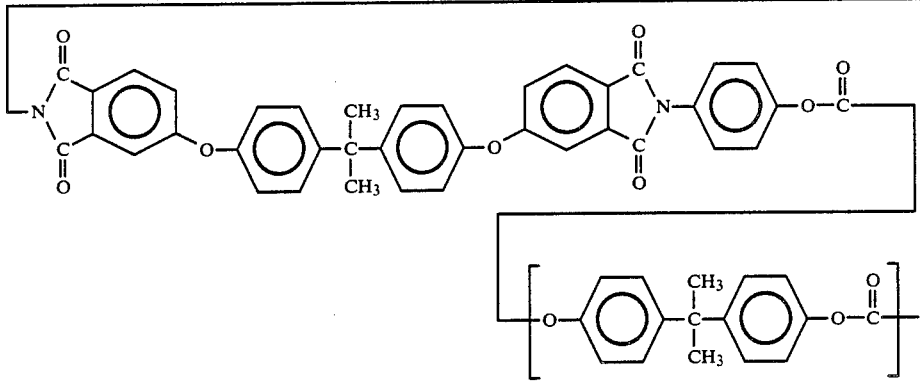

wherein n is about 7.6.

EXAMPLE 2

In a 2-liter flask equipped for interfacial condensation was added the end-capped polyetherimide of Procedure C, 20 g. (0.0057 mole), 80 g. (0.350 mole) of bisphenol-A, 650 ml. of methylene chloride, 1 ml. of triethylamine, 1.2 g. (0.008 moles) p-tert-butylphenol and 450 ml. of water. The pH was raised to 10.5–11.5 and the mixture was phosgenated at 0.75 g./min. for 45 minutes. The layers were separated, washed with water, washed with hydrochloric acid, and washed with water to pH 7. The block co-polymer was precipitated in hot water (85°–90° C.). It had an intrinsic viscosity of 0.73 dl./g. (in chloroform). It had a single Tg of 160° C.

The product contained units of the formula

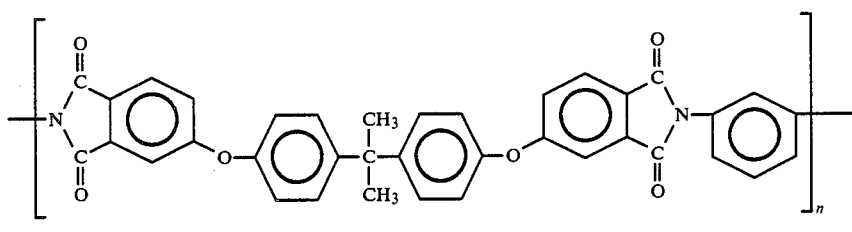

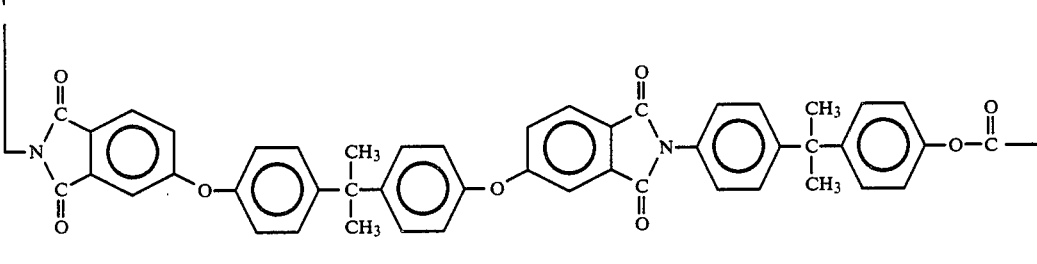

wherein n is about 7.6.

EXAMPLE 3

In a 2-liter flask equipped for interfacial condensation was added the end-capped polyetherimide of Procedure D, 80 g. (0.0267 mole), 20 g. (0.0876 mole) of bisphenol-A, 650 ml. of methylene chloride, 0.2 ml. of triethylamine, and 450 ml. of water. The pH was raised to 10.5–11.5 and the mixture was phosgenated at 0.5 g./min. for 27 minutes. The layers were separated, washed with water, washed with hydrochloric acid, and washed with water to pH 7. The block co-polymer was precipitated in hot water (85°–90° C.). It had an intrinsic viscosity of 0.67 dl./g. (in chloroform). It had a single Tg of 192° C.

The product contained units of the formula

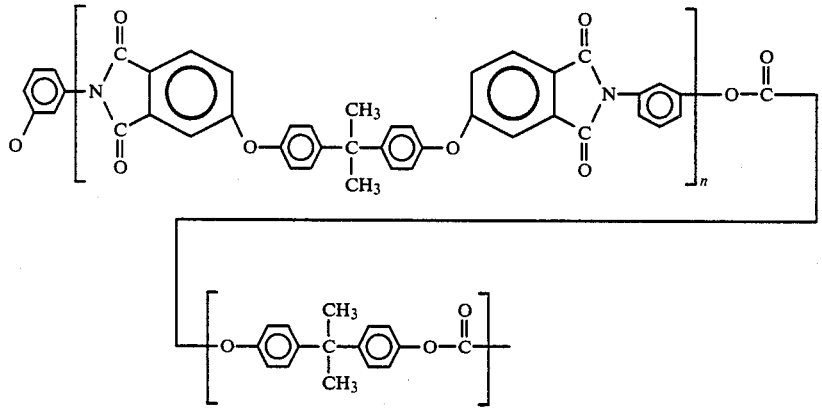

wherein n is about 7.6.

EXAMPLE 4

In a 2-liter flask equipped for interfacial condensation was added the end-capped polyetherimide of Procedure D, 40 g. (0.0133 mole), 32 g. (0.14 mole) of bisphenol-A, 8 g. (0.276 moles) the bisphenol of acetophenone, 1.0 g. (0.0067 moles) p-tert-butylphenol, 600 ml. of methylene chloride, 1 ml. of triethylamine, and 450 ml. of water. The pH was raised to 10.5–11.5 and the mixture was phosgenated at 0.75 g./min. for 45 minutes. The layers were separated, washed with water, washed with hydrochloric acid, and washed with water to pH 7. The block co-polymer was precipitated in hot water (85°–90° C.). It had an intrinsic viscosity of 0.58 dl./g. (in chloroform). It had a single Tg of 180° C.

The product contained units of the formula

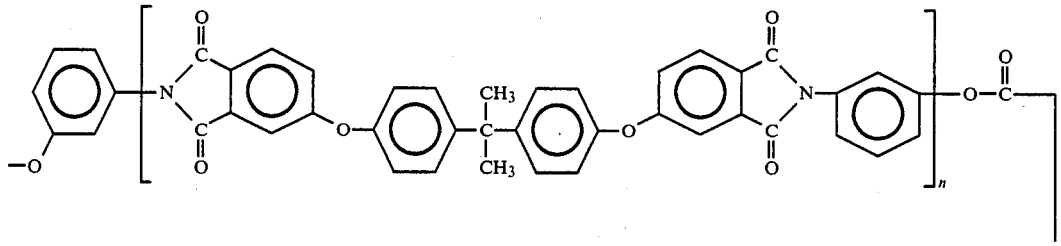

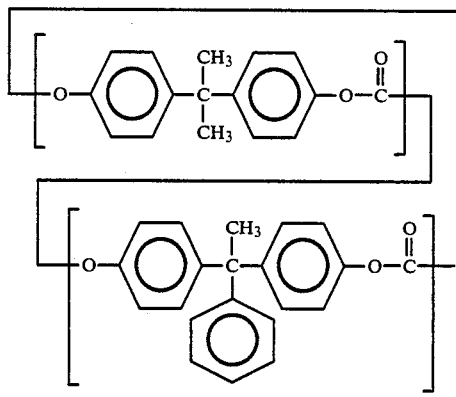

wherein n is about 7.6.

EXAMPLES 5–6

Blends of 25 and 50 wt % of the block copolymer of Example 1 and 75 and 50 wt % of styrene-acrylonitrile resin (SAN) are made by mixing chloroform solutions, evaporating to dryness and molding at 510° F. into films, and if the toughness is compared with unmodified resin by bending the sample over on itself and noting its resistance to cracking, then the following results were obtained:

| | Composition, wt % | | |
|---|---|---|---|
| Example | Thermoplastic | Example 1 | Observation |
| 5A* | SAN-100 | — | brittle |
| 5 | SAN-75 | 25 | tough |
| 6 | SAN-50 | 50 | tough |

*Control

EXAMPLES 7-9

If the block copolymer of Example 1 is blended with poly(bisphenol A) carbonate by mixing chloroform solutions, evaporating to dryness and compression molding the blend, the results will be as follows:

| Example | wt % Copolymer | Observation | DSC (Tg) Glass Transition |
|---|---|---|---|
| 7 | 10 | tough | 152° C. |
| 8 | 25 | tough | 155° C. |
| 9 | 40 | tough | 158° C. |

Compatible blends having high clarity and toughness should be obtained.

It is anticipated that the blends according to this invention will toughen the otherwise brittle commercially important thermoplastic resins.

All of the foregoing patents and/or publications are incorporated herein by reference. Obviously, other modifications and variations of the present invention are possible in light of the above teachings. It is, therefore, to be understood that changes may be made in the particular embodiments of the invention described which are within the full intended scope of the invention as defined by the appended claims.

I claim:

1. A poly(etherimide carbonate) having a mean weight average molecular weight $M_w$ of between about 15,000 and 40,000 and being of the general formula (I) comprising:
   (a) from about 5 to 80% by weight of polyetherimide segments (A) with mean number-average molecular weight $M_n$ of between 1,000 and 6000; and
   (b) polycarbonate segments B:

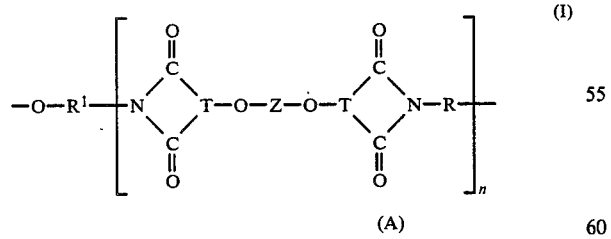

(A)

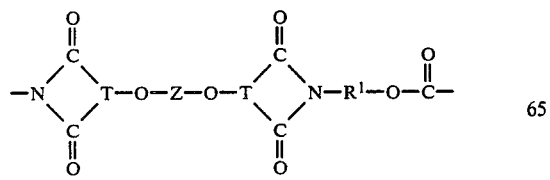

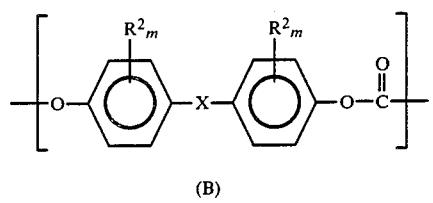

(B)

wherein, the —O—T< group is selected from:

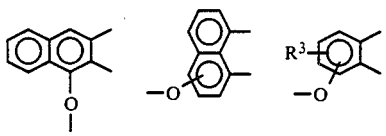

$R^3$ being hydrogen, lower alkyl or lower alkoxy; and Z is:

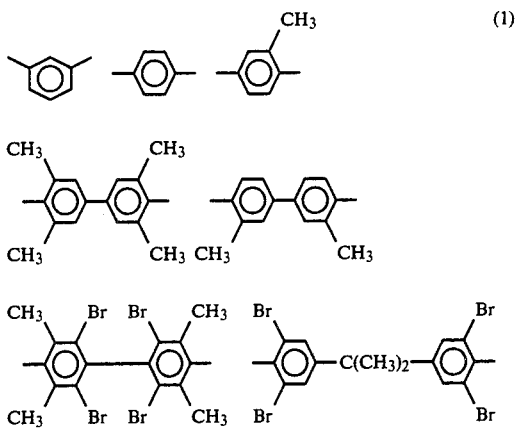

or a (2) divalent organic radical of the general formula:

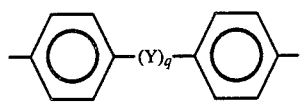

where Y is a divalent radical of the formulae:

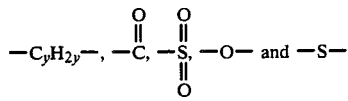

where q is 0 or 1, y is a whole number from 1 to 5; and R is a divalent organic radical selected from (1) an aromatic hydrocarbon radical having from 6-20 carbon atoms and halogenated derivatives thereof, (2) an alkylene radical or a cycloalkylene radical having from 2-20 carbon atoms, a $C_{(2-8)}$ alkylene terminated polydiorganosiloxane, and (3) a divalent radical of the formula:

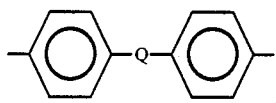

where Q is

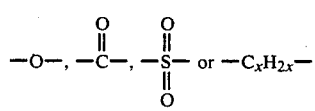

where x is a whole number from 1 to 5 inclusive; and R¹ is as defined for R above; and X is a bond or $C_1$-$C_8$ alkylene, $C_2$-$C_8$ alkylidene, $C_5$-$C_{15}$ cycloalkylene, $C_5$-$C_{15}$ cycloalkylidene, $SO_2$, SO, O, CO or

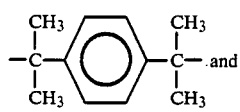

$R^2$ denotes hydrogen, chlorine, bromine or alkyl of 1 to 3 carbon atoms; n is an integer of from about 3 to about 12 and m is 1 or 2.

2. The compound as defined in claim 1, wherein the polyetherimide blocks are of the formula:

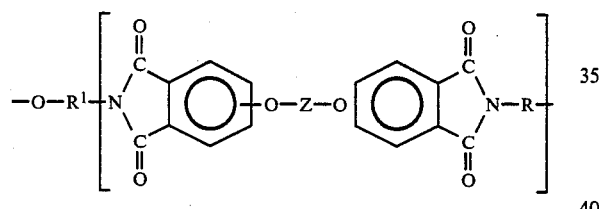

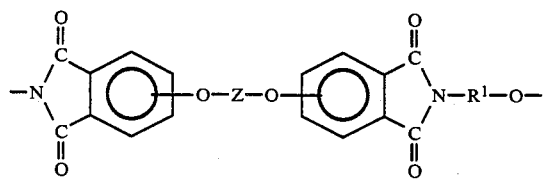

where Z, R¹ and R are as previously defined.

3. A compound as defined in claim 1, wherein the divalent bonds of the —O—Z—O radical are in the 3,3'; 3,4'; 3' or 4,4' position.

4. A composition as defined in claim 1, wherein Z is

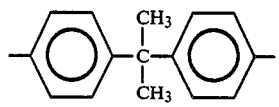

5. A compound as defined in claim 1, wherein R and R¹ are independently selected from:

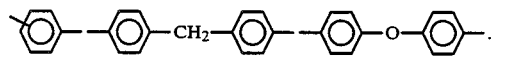

6. A compound as defined in claim 1, wherein R is

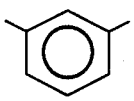

and R¹ is

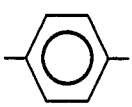

7. A compound as defined in claim 1, wherein X is 2,2 isopropylidene.

8. A compound as defined in claim 1, wherein $R^2$ is either a hydrogen atom or methyl group in the 3' or 5' position.

9. A compound as defined in claim 8, wherein m is 2.

10. A compound as defined in claim 1, wherein polyetherimide segment (A) comprises from about 80 to 20% by weight and polycarbonate segment (B) comprises from about 20 to 80% by weight.

11. A molding composition comprising a blend of:
(a) a poly(etherimide carbonate) having a mean weight average molecular weight $M_w$ of between about 15,000 and 40,000 and being of the general formula (I) and comprising
(i) from about 5 to 80% by weight of polyetherimide segments (A) with mean number-average molecular weight $M_n$ of between 1,000 and 6000; and
(ii) polycarbonate segments (B);

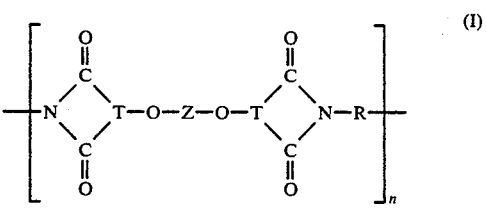

(A)

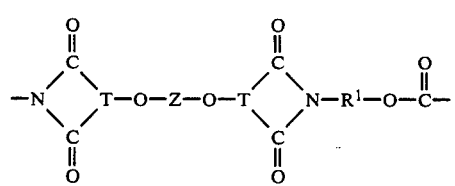

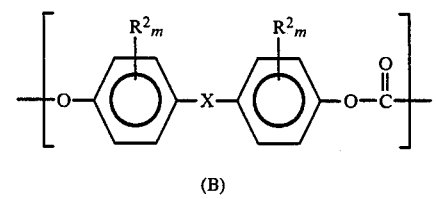

(B)

wherein, the —O—T< group is selected from:

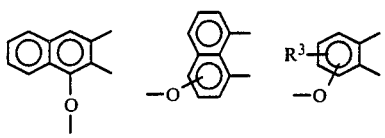

$R^3$ being hydrogen, lower alkyl or lower alkoxy; and Z is:

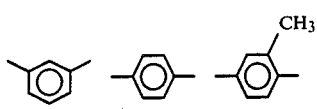   (1)

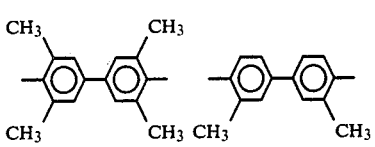

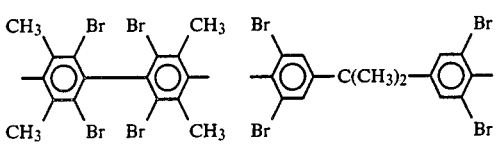

or a (2) divalent organic radical of the general formula:

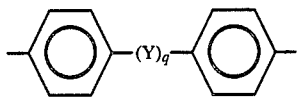

where Y is a divalent radical of the formulae:

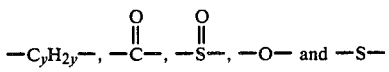

where q is 0 or 1, y is a whole number from 1 to 5; and R is a divalent organic radical selected from (1) an aromatic hydrocarbon radical having from 6–20 carbon atoms and halogenated derivatives thereof, (2) an alkylene radical or a cycloalkylene radical having from 2–20 carbon atoms, a $C_{(2-8)}$ alkylene terminated polydiorganosiloxane, and (3) a divalent radical of the formula:

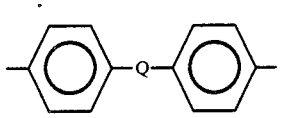

where Q is

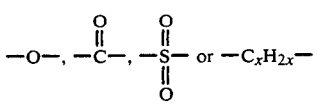

where x is a whole number from 1 to 5 inclusive; and $R^1$ is as defined for R above; and X is a bond or $C_1$–$C_8$ alkylene, $C_2$ to $C_8$ alkylidene, $C_5$–$C_{15}$ cycloalkylene, $C_5$–$C_{15}$ cycloalkylidene, $SO_2$, SO, O, CO or

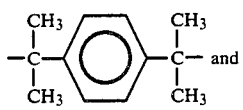

$R^2$ denotes hydrogen, chlorine, bromine or alkyl of 1 to 3 carbon atoms; n is an integer of from about 3 to about 12 and m is 1 or 2; and (b) at least one thermoplastic polymer selected from styrene resins, acrylate resins, vinyl chloride polymers, polyesters, aromatic polycarbonates, poly(arylethers), copolyetherester block copolymers, polyhydroxyethers, polyimides, polyphenylene ethers or mixtures of any of the foregoing.

12. A composition as defined in claim 11 wherein the thermoplastic polymer (b) is an aromatic polycarbonate.

13. A composition as defined in claim 12 wherein the aromatic polycarbonate is the reaction product of a dihydric phenol and a carbonate precursor.

14. A composition as defined in claim 13 wherein the dihydric phenol is bisphenol-A and the carbonate precursor is phosgene.

15. A composition as defined in claim 11 wherein the thermoplastic polymer (b) is a styrene resin.

16. A composition as defined in claim 15 wherein the styrene resin is a styrene-acrylonitrile copolymer resin.

* * * * *